United States Patent [19]
Frisch, deceased et al.

[11] B 3,989,589
[45] Nov. 2, 1976

[54] HYDRAULIC DRIVE FOR CONTROL RODS

[75] Inventors: Erling Frisch, deceased, late of Pittsburgh, Pa., by Dorothy Randall Frisch, administratrix; Harry N. Andrews, Franklin Township, Westmoreland County, Pa.

[73] Assignee: Westinghouse Electric Corporation, Pittsburgh, Pa.

[22] Filed: June 6, 1973

[21] Appl. No.: 367,621

[44] Published under the second Trial Voluntary Protest Program on February 3, 1976 as document No. B 367,621.

[52] U.S. Cl............................................ 176/36 R
[51] Int. Cl.²........................................ G21C 7/08
[58] Field of Search............... 173/36 R, 36 C, 36 S

[56] References Cited
UNITED STATES PATENTS

| | | | |
|---|---|---|---|
| 2,855,899 | 10/1958 | Beaty | 176/36 R |
| 3,154,472 | 10/1964 | Shannon | 176/36 R |
| 3,607,629 | 9/1971 | Frisch | 176/36 R |

*Primary Examiner*—Samuel Feinberg
*Attorney, Agent, or Firm*—Z. L. Dermer

[57] ABSTRACT

A nuclear reactor is disclosed wherein hydraulic drive mechanisms for control rods are provided with a positive mechanical latching arrangement to maintain the control rods in a withdrawn position with respect to the core. With this arrangement, the coil of an associated electromagnet must be deliberately energized in order to insert the control rod into the core thus making accidental tripping highly unlikely. The drive mechanism is further provided with a hydraulic decelerating device which uses reactor coolant water to smoothly decelerate the control rod as it approaches the fully withdrawn position.

11 Claims, 10 Drawing Figures

HYDRAULIC DRIVE FOR CONTROL RODS

BACKGROUND OF THE INVENTION

1. Field of the Invention:

This invention pertains to control mechanisms for nuclear reactors, and more particularly to hydraulically operated drive mechanisms for a control rod having a positive mechanical latch arrangement for holding the control rod in a withdrawn position.

2. Description of the Prior Art:

In accordance with the prior art, certain power reactors are controlled by a combination of chemical shim systems and rod cluster control systems. In pressurized water reactors of the type exemplified, the chemical shim system typically consists of adding boric acid to the reactor coolant. Boric acid has the effect of lowering the effective multiplication factor of the nuclear core to slightly above 1.0 so that the nuclear chain reaction is just capable of maintaining itself and does not become supercritical. There is significantly more boric acid present in the reactor coolant at beginning of core life than at the end of core life due to the differing amounts of fissile material present in the core during those times, respectively. Conceivably a pressurized water nuclear reactor may be completely controlled with a chemical shim system; however, the time factor involved in changing the concentration of boric acid makes this method of control impractical. As a result, a boric acid chemical shim is usually assisted by a rod cluster control system which permits rapid changes in reactivity of the nuclear core. The rod system is a mechanical system which generally comprises 16 to 20 control or neutron absorbing rods situated to be moved axially within cooperating guide tubes in selected fuel assemblies of the core. In the earlier prior art, all of the control rods associated with each of the fuel assemblies were attached to a single spider-like hub which in turn was attached to a drive shaft. Thus, all of the control rods were operated simultaneously and because of the relatively large worth of a single control rod assembly, the control rods were operated in discrete steps over the entire distance of travel.

As indicated and explained in detail in U.S. Pat. No. 3,519,535 issued July 7, 1970 to Erling Frisch and Harry Andrews, entitled A Nuclear Reactor, and assigned to the assignee of the present invention, reactors utilizing rod control systems or other incrementally movable control elements have several limiting characteristics. The worth of each control cluster is too great to be used for suppressing radial flux peaks. Partial insertion of a cluster can cause sever perturbations in the axial flux distribution and can lead to xenon cycling. As further explained in pending application Ser. No. 53,206, filed July 8, 1970 of E. Frisch and H. Andrews, Reactor Refueling Method, now Pat. No. 3,775,246 granted Nov. 27, 1973, and assigned to the present assignee, an optimum control system would accordingly have two primary characteristics. A wide disposal of individually movable low worth absorber rods; and no control configuration wherein certain control rods are partially inserted. Such a control system would result in appreciable savings due to more efficient usage of nuclear fuel. In this regard, a highly reliable drive mechanism which is capable of positioning a plurality of two position control elements is necessary to render such a desirable control system practical. A relatively large number of drive mechanisms would, however, be necessary; further, they must not be so large that they cannot be mounted side by side on a reactor vessel. A prior art solution to these problems is disclosed in U.S. Pat. No. 3,607,629 issued Sept. 21, 1971 by E. Frisch et al, Drive Mechanism For Control Elements, and assigned to the present assignee.

The most recent prior art then, discloses a hydraulic control rod drive mechanism which utilizes the substantial pressure available in pressurized reactors to move the absorber or control rods relative to stationary fuel assemblies with which they are associated. The hydraulic mechanism allows independent movement of individual control rod drive shafts having one or more absorber rods attached thereto, to be fully withdrawn from or fully inserted into the core. Each mechanism has provision to accommodate a multiplicity of control rod drive shafts. A number of electromagnets are mounted to the hydraulic mechanism; one electromagnet being associated with each control rod drive shaft. A fully withdrawn control rod is held in this position by actuation of the respective electromagnet. Thus, in the prior art a mechanism is disclosed which allows a reactor to be controlled by a large and diverse pattern of low worth two position control rods and therefore to more nearly achieve the full potential of its fissile fuel.

Even with these most recent developments, in the prior art, namely, hydraulic control rod drive mechanisms, the method of operation for full length control rods is, however, not considered satisfactory for part length control rods which are also required in today's large nuclear reactors. Part length control rods are utilized to trim the axial power distribution of the core and to prevent divergence of the xenon cycling within the core. In a typical large nuclear reactor, eight part length control rod assemblies each containing 20 individual control rods are interspersed throughout the core. For purposes of comparison, the same reactor example would also use 53 full length control rod assemblies, with each assembly containing 20 individual control rods. A part length control rod contains absorber material only in the lower part of its length. For example, in the same large reactor previously illustrated, the lower three feet of a control rod having a total length of twelve feet contains neutron absorbing material. Withdrawal of a part length control rod moves the absorber section from the lower to the upper part of the core and is therefore not totally removed or withdrawn from the core as is the case with the regular control rods. Tripping or rapidly inserting a part length control rod may actually increase core reactivity. Simultaneous tripping of several part length control rods may then result in an undesirable increase in reactor power level even though all full length control rods are tripped at the same time. Such an event is a distinct possibility in the prior art in reactors equipped with hydraulically operated control rod drive mechanisms by accidental deenergizing of an electromagnet holding coil bus.

SUMMARY OF THE INVENTION

The aforementioned problems of the prior art are overcome by providing a nuclear reactor having hydraulically operated control rod mechanisms wherein individual part length control rods are either fully inserted or fully withdrawn, and, while in the latter position, are retained by a positive mechanical latch arrangement.

In an exemplary embodiment, the present invention utilizes a differential pressure to drive a piston which is connected to a control rod drive shaft having one or more individual control part length control rods connected thereto. To withdraw a control rod, an electromagnetic valve is actuated which exposes one side of the piston to a variable source of pressure which is lower than the high constant pressure available in pressurized reactors and to which the other end of the piston is exposed. A single hydraulic control rod mechanism is capable of acting upon a multiplicity of control rod drive shafts, either singly or in concert.

The part length control rod assemblies are retained in a fully withdrawn position by the mechanical engagement of coacting members; one engaging member being attached to the piston of a control rod drive shaft, and the other being integral with a latch mechanism provided within the control rod drive mechanism. When the piston is lifted by application of differential hydraulic pressure, the engaging member attached to the piston momentarily pushes aside and then engages the other engaging member. Insertion of a part length control rod is accomplished by actuating an electromagnet which disengages the latch mechanism and allows the control rod assembly to drop by gravity.

On withdrawal, a control rod is smoothly decelerated from a relatively high velocity by a decelerating device before the engaging members impart. An envisioned decelerating device comprises a localized restriction in the cylinder wall located within the housing of the drive mechanism. When the piston reaches this restriction, the water trapped above the piston, is forced through the restriction creating a considerable over-pressure which slows down the movement of the piston.

The combination of the above enumerated features constitutes a nuclear reactor which is controlled by a large and diverse pattern of low worth two position part length control elements and provides a latching means which positively holds the part length control rod in a withdrawn position.

BRIEF DESCRIPTION OF THE DRAWINGS

Other advantages of the invention will be apparent from the following detailed description taken in consideration with the accompanying drawings, in which.

DESCRIPTION OF THE PREFERRED EMBODIMENTS

Figure 1:
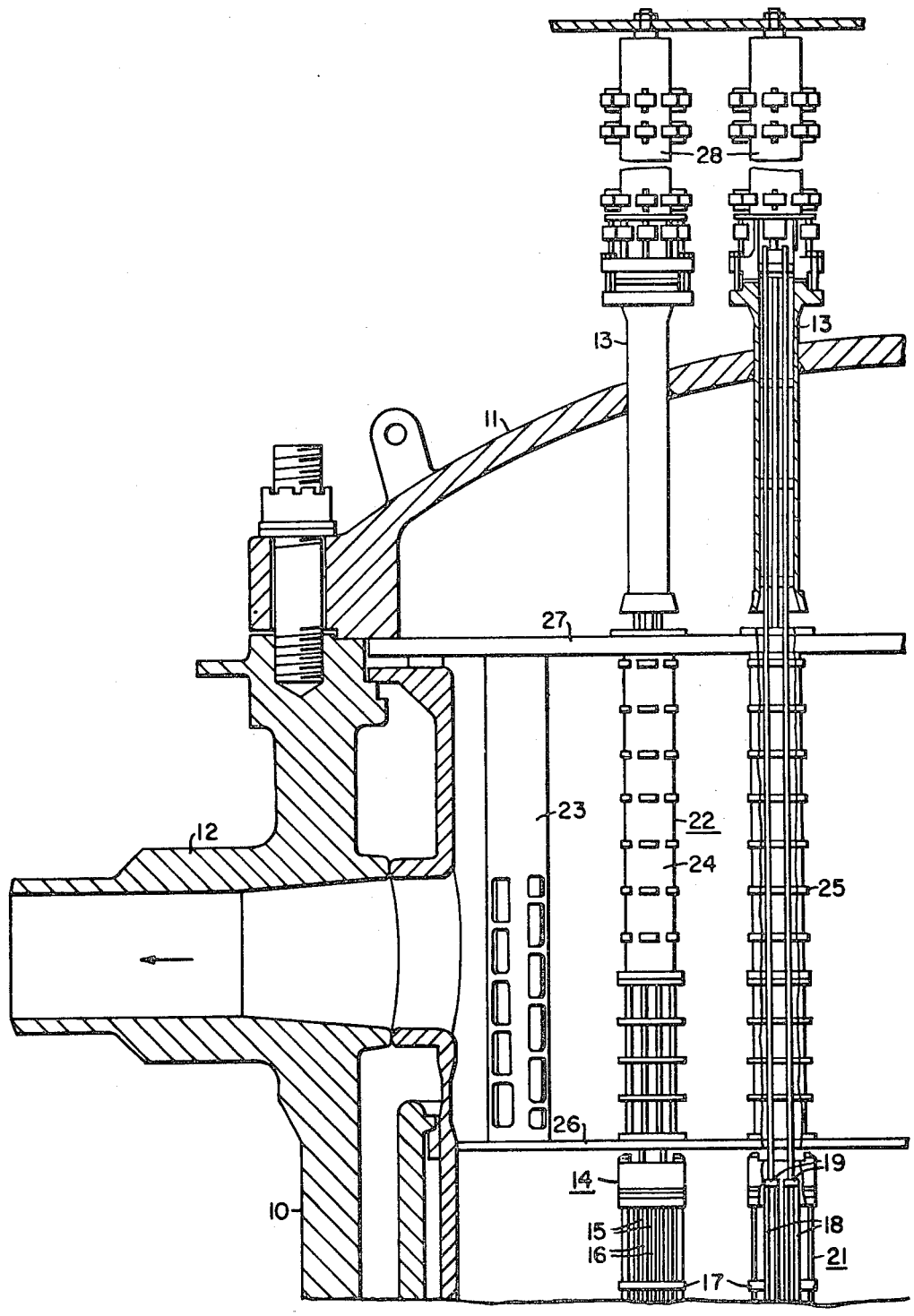
FIG. 1 is a sectional view of a portion of a nuclear reactor having widely dispersed individually movable two position control rods.

Throughout the description which follows, like reference characters indicate like elements in the various figures of the drawings.

FIG. 1 illustrates a nuclear reactor incorporating the hydraulic control rod drive mechanism provided by this invention. A reactor vessel 10 is shown which forms a hermetically sealed pressurized container when sealed by closure head 11. The reactor vessel 10 has coolant flow inlet nozzles (not shown) and coolant flow outlet nozzles 12 in and through the cylindrical wall thereof. The closure head 11 has a plurality of head penetration adaptors 13 extending through a substantially hemispherical wall and sealingly affixed thereto. A nuclear core comprising a plurality of fuel assemblies 14 is contained within the reactor vessel 10. For purposes of simplicity only two fuel assemblies 14 are shown. Each fuel assembly 14 includes a plurality of fuel rods 15 and a plurality of guide tubes 16 symmetrically interspersed therebetween. The fuel rods 15 and guide tubes 16 are held in a fixed relationship with respect to each other by an egg crate type of grid structure 17. This type of so-called canless fuel assembly 14 is well known in the art. The guide tubes 16 serve as guidance channels or receptacles for full length or part length control rods 18. In FIG. 1, again for purposes of simplicity, four control rods 18 are shown whereas as many as 20 individual control rods are used within a single fuel assembly 14 in a typical large nuclear reactor. This invention however is not thereby restricted to a particular number of control rods in any given fuel assembly.

The worth of a single control rod 18 is so calibrated that the insertion of one or two such rods will not greatly change the power distribution of the entire core as would the insertion, for example, of a complete cluster of part length control rods. However, a single control rod 18 would have enough control rod worth to axially trim the power distribution in its immediate vicinity.

Figure 5:
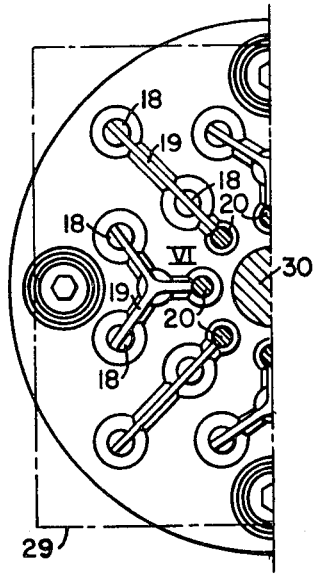
FIG. 5 is a cross-sectional view taken along line V—V of FIG. 2.
Figure 6:
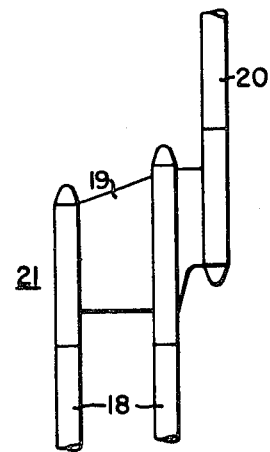
FIG. 6 is a view taken along line VI—VI of FIG. 5.

The distribution of control rods 18 within a fuel assembly 14 is shown in FIG. 5. The part length control rods 18 are joined in pairs at their upper ends to thin gusset plates 19 to which drive shafts 20 are also attached. This can be seen more clearly in FIG. 6. It is to be realized, that although the figures show two control rods 18 attached to one drive shaft 20, either one or, in the alternative, more than two control rods 18 might be used with a single drive shaft 20. Control rod assemblies 21 are not used in all of the fuel assemblies 14; a large nuclear reactor will typically have eight fuel assemblies 14 equipped with part length control rod assemblies 21.

In FIG. 1 it is seen that the plurality of drive shafts 20 associated with a fuel assembly 14 pass through a guide tube structure assembly 22. Guide tube structure 22 guides individual drive shafts 20 on passage through a reactor coolant outlet plenum 23 which is positioned above the nuclear core. The drive shaft guide structure 22 consists of a generally square vertical column 24 having guide plates 25 axially disposed therein. The guide tube support structure 22 extends between an upper core plate 26 and an upper support plate 27.

Figure 2:
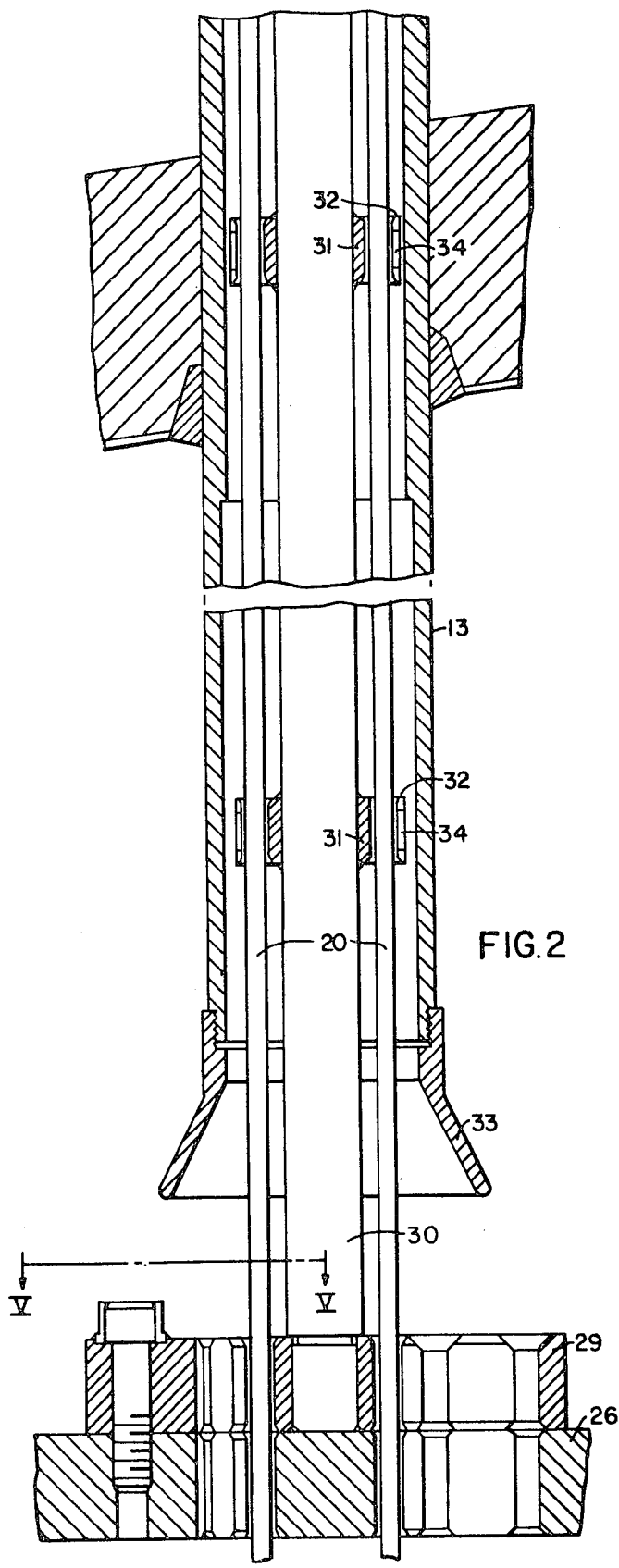
FIGS. 2, 3 and 4 taken end to end, show the drive mechanism of this invention having a piston shown in FIG. 3 and in phantom in FIG. 4.

The control rod drive shafts 20 pass within and through the reactor vessel head penetration adaptors 13 and terminate within hydraulic control rod drive mechanisms 28 as provided by this invention. The exact manner by which the control rod drive shafts 20 are guided and supported within the head penetration adaptor 13 is shown in FIG. 2. The drive shafts 20 are supported above the upper support plate 26 by a flange 29 to which is attached a vertical central shaft 30. Circular guide plates 31 are attached to the central shaft 30 such as by welding and are provided with holes 32 to support and guide the drive shafts 20. The funnel-shaped member 33 and the slots 34 in guide blocks 31 serve to facilitate assembly.

Figure 3:
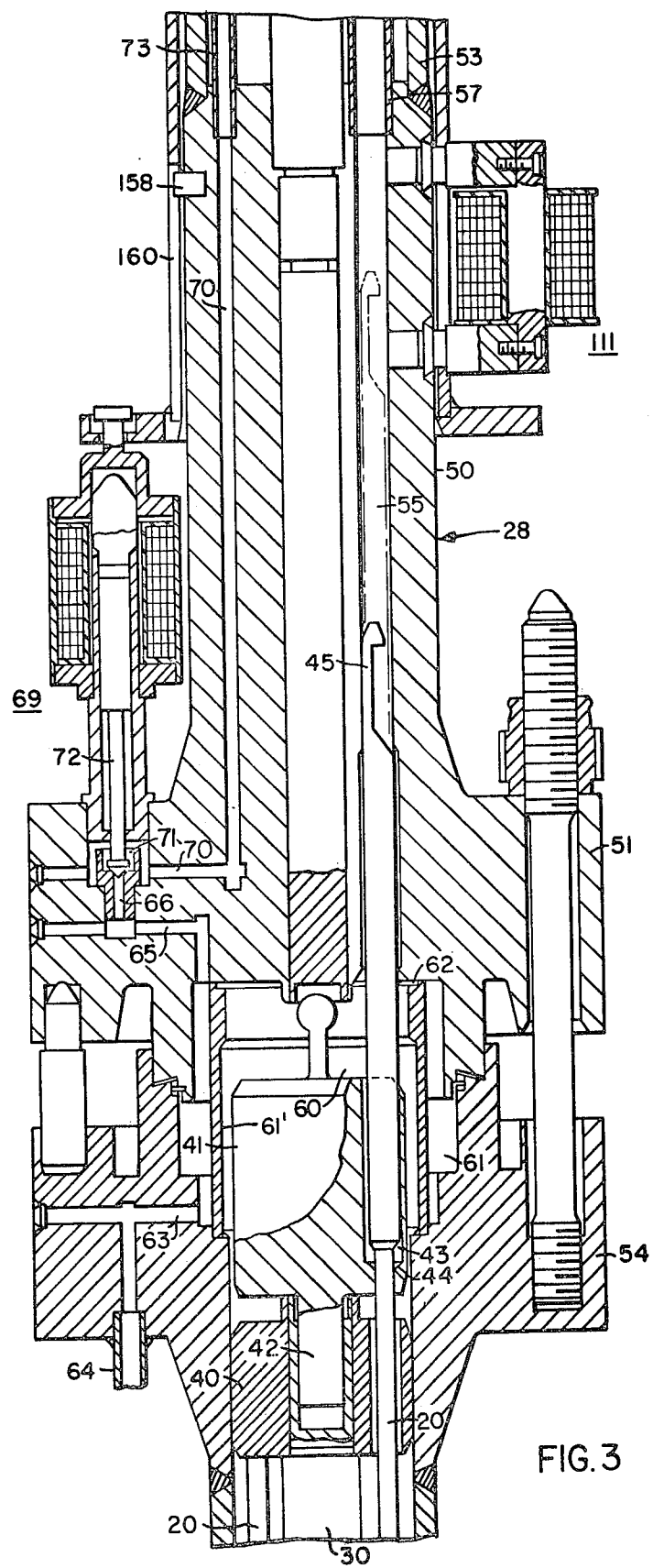

The upper portion of the head penetration adaptor 13 is shown in detail in FIG. 3. A guide block 40 provides final guidance for the control rod drive shaft 20 just prior to exiting from the head penetration adaptor 13. A cylindrical lifting fixture 41 rests on top of guide block 40 and is oriented therewith by means of pin 42. The lifting fixture 41 is provided with vertical holes 43 with ledges 44 into which pistons 45 attached to the drive shafts 20 nest when the control rod assemblies 21 are in their full inserted position in the core. Any anticipated misalignment between the pistons 45 and their guide channels will be compensated for by a slight rotation of the lifting fixture 40.

Figures 4, 7, 8, 9, 10:
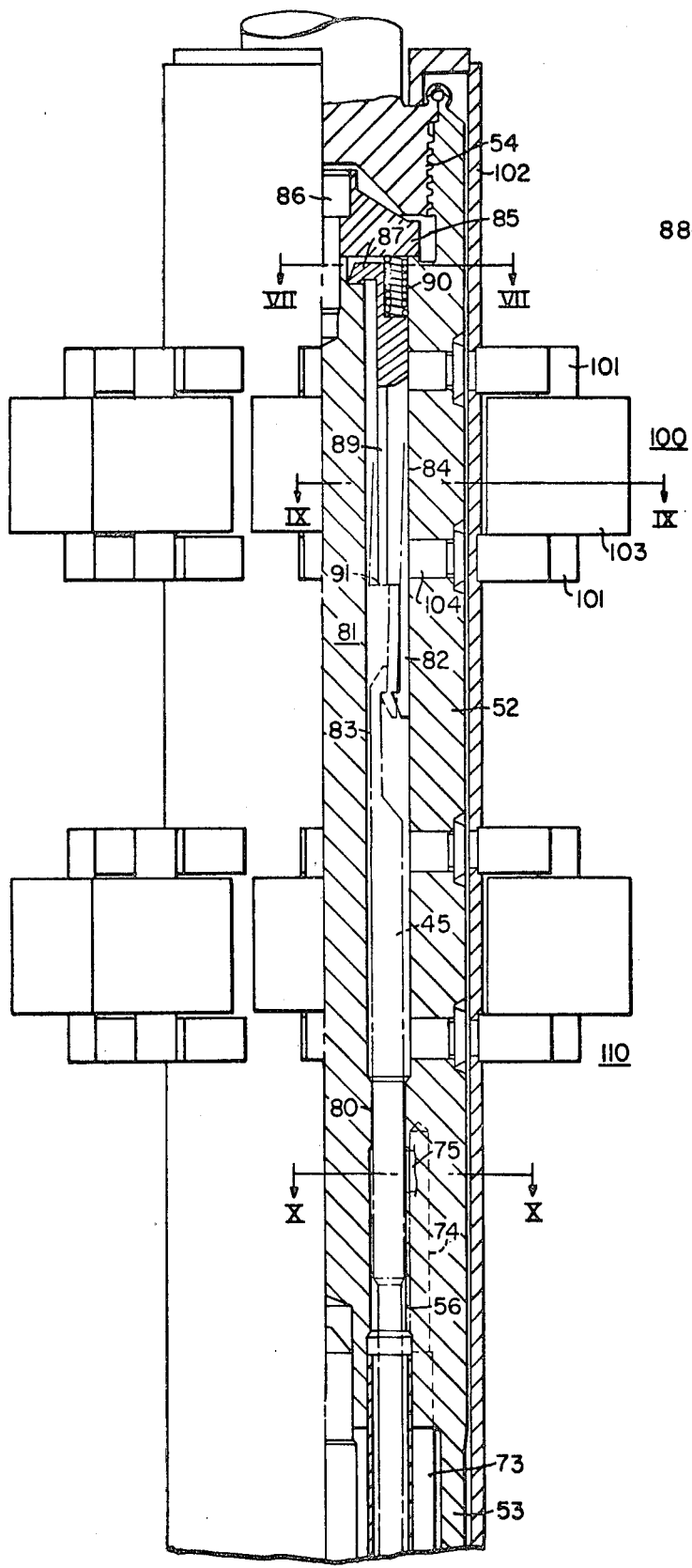
FIG. 7 is a cross-sectional view taken along line VII—VII of FIG. 4.
FIG. 8 is an elevated view of the section shown in FIG. 7.
FIG. 9 is a cross-sectional view taken along line IX—IX of FIG. 4.
FIG. 10 is a cross-sectional view taken along line X—X of FIG. 4.

The control rod drive mechanism 28 is attached to the head penetration adaptor 13 as shown in FIGS. 1 and 3. The details of the control rod drive mechanism 28 are shown in FIGS. 3, 4, 7, 8, 9 and 10. Referring now to FIGS. 3 and 4, it is seen that the drive mechanism 28 comprises a pressure bearing member which includes a cylindrical base 50 having an outwardly extending flange 51 at its lower extremity and an upper cylindrical head cap 52 joined by welding to an intermediate heavy walled tube 53. The upper cylindrical head cap 52 is sealed by a threaded and steel welded plug 54 or other suitable means. Flange 51 of the mechanism is sealingly connected to flange 54 of the head penetration adaptor 13 thereby maintaining the pressure containing integrity of the reactor vessel 10.

A plurality of cylinders are provided within the control rod drive mechanism; one cylinder being provided for each control rod assembly 21 being actuated by the drive mechanism 28. The cylinders comprise the channel formed by a machined hole 55 in base 50, a long tube 57 within intermediate tube 53 and a machined hole 56 in the head cap 52. The long tube 57 is fixedly supported in tight counter-bores in openings of holes 55 and 56 as shown in FIGS. 3 and 4. Between the counter-bore supporting points, the long tubes 57 are laterally supported by appropriate guide blocks (not shown) axially disposed with intermediate tube 53.

As mentioned above, the control rod assemblies 21 are withdrawn from the core by differential hydraulic pressure acting on piston 45. The manner in which this is accomplished is shown in detail in FIG. 3. Referring now to that figure, the central space 60 directly below the flange 51 of the mechanism 28 is opened to the reactor vessel interior and is thereby pressurized to the pressure of the reactor coolant, which in the example shown is approximately 2000 psi. Space 60 is separated from a surrounding annular space 61 having a pressure of approximately 1700 psi. Pressurized areas 60 and 61 are conventionally sealed from each other by means of an O-ring gasket 62 acting in conjunction with tubular member 61'. Space 61 is connected to an exterior adjustable pressure source (not shown) by flow channels 63 machined within flange 54 of the head penetration adaptor 13 and tubing 64 connected thereto. Flow channel 65 within the flange 51 of the control rod drive mechanism 28 is connected at one side to space 61 and at the other side to one port 66 of an electromagnetically operated valve 69. As can be seen, valve 69 is attached to and supported by the lower portion or base 50 of the control rod drive mechanism 28. One valve 69 is provided for each control rod assembly 18. A second port 71 of valve 69 is flow connected to channel 70 which is machined in base 50. Ports 66 and 71 are sealingly separated by a seal connected valve stem 72 of the magnetic valve 69. Flow channel 70 is flow connected to the top of piston 45 by connecting tube 73 and holes 74 and 75, within the upper cylindrical head cap 52 of the mechanism (FIG. 4, FIG. 10).

Withdrawal of the control rod assembly from the core is accomplished by energizing the coil of the magnetic valve 69 thereby lifting valve stem 72 from its seat. This has the effect of connecting the 1700 psi hydraulic pressure within space 61 to the top of piston 45. Since approximately 2000 psi hydraulic pressure acts on the lower part of piston 45, a net hydraulic pressure differential of approximately 300 psi acts on the control rod piston 45. This pressure differential causes the control rod assembly 21 to move at a rather high speed toward its fully withdrawn position. So as to lessen the shock of the control rod assembly reaching this final position, a self-damping decelerating mechanism is provided in the upper cylindrical head cap 52 as shown in FIG. 4. The decelerating device comprises a restriction 80 located in the upper part of the hydraulic cylinder 56 dimensioned to give a rather close diametrical clearance between the piston 45 and cylinder 56. A typical diametrical clearance might be of the order of ten to twenty-five thousandths of an inch. When the piston 45 reaches restriction 80, the water trapped above piston 45 is forced through the clearance gap thereby creating a considerable overpressure within the trapped water. This effectively and slowly decelerates the motion of the control rod assembly 21 as it reaches its fully withdrawn position. It is to be observed that restriction 80 has, of course, the effect of increasing the time required to fully insert the control rod assembly by gravity. However, this is a distinct advantage for part length control rods since as previously explained, full insertion of part length control rods has the effect of increasing reactivity of the core. On the other hand, the increased drop time of full length control rods may possibly be a disadvantage especially during reactor scramming operations when rapid insertion of these control rods is required.

After a piston 45 has reached its upper limit of travel, it is held that this position by an internal mechanical latching arrangement 81, the magnetic valve 69 is then deenergized so as to conserve the pumping potential of the system. The latching assembly 81, which is located within the upper portion of the cylindrical head cap 52, has a hook shape lower end 82 which engages with a similarly shaped end 83 on the piston 45. The latch assembly 81 fits within an extension 84 of the cylinder 56. Extension 84, however, has a slightly larger diameter than cylinder 56. Extension 84 is closed at its top by a cover plate 85 which is secured to the upper cylindrical head cap 52 by a central bolt 86. The cover plate 85 and the central bolt 86 are located immediately below the threaded and welded seal plug 54. Thus, the pressure containing integrity of the control rod drive mechanism 28 is maintained. A radial projection 87 of the latch 89 fits into a narrow slot 88 (FIG. 7) machined radially in cylinder extension 84. As more clearly shown in FIGS. 7 and 8, the projection 87 serves as a seat and fulcrum for the latch 89 and maintains the correct rotational location of the latch 89 with respect to the bore of cylinder extension 84. A spring 90 which is fitted within a respective hole in the latch 89 tends to rotate the latch 89 around its fulcrum point until the edge of the ledge 91 contacts the wall of the cylinder extension 84. This is the normal position of the latch assembly 81 when the control rod assembly is inserted in the core. When the piston 45 and hence the control rod assembly 21 is lifted by application of the differential hydraulic pressure, the latch 89 will be pushed aside momentarily but will be returned immediately to the latched position (as indicated by the dash and dot lines) by latch spring 90 when the piston 45 reaches its uppermost position which is somewhat higher than that shown in FIG. 4. When the hydraulic differential pressure is removed, by deenergizing the magnet valve 69, the piston 45 will drop slowly until its movement is arrested when the hook shaped ends of the piston and the latch mechanism 82 and 83 respectively, firmly engage thereby holding the control rod assembly 21 in a fully withdrawn position.

An electromagnet 100 is provided to permit insertion of the control rod assembly 21 from a withdrawn and latched position. The electromagnet 100 consists of two pole pieces 101 which are attached by welding to a nonmagnetic support tube 102 surrounding the upper cylindrical head cap 52 and resting on top of the seal plug 54. As can be seen most clearly in FIG. 9, the inner faces of the pole pieces 101 are machined to obtain a close fit with the head cap 52. A magnetic coil 103 is conventionally mounted to the pole pieces 101. A magnetic path to the latch 89 which is made of magnetic stainless steel or other suitable material, is completed by plugs 104 made of the same material. The plugs 104 may be threaded into the non-magnetic head cap 52 and may be pressure sealed by welding. When the coil 103 of the electromagnet 100 is energized, a magnetic force of sufficient magnitude is exerted on the latch 89 to disengage the latch mechanism 81 from the piston 45 permitting insertion by gravity of the associated control rod assembly 21.

Position indicating electromagnets 110 and 111 are provided for each control rod assembly 21 to ascertain a withdrawn or inserted position, respectively. Electromagnets 110 and 111 are mounted to the non-magnetic support tube 102 in similar fashion as electromagnet 100. To ascertain the position of the piston 45 an AC signal is imposed on the coil of electromagnets 110 and 111. The presence or absence of the piston 45 in the vicinity of the electromagnets will change the AC coil current thereby indicating the position of the control rod assembly. For this purpose, it is necessary that the entire drive shaft 45 be made of a magnetic steel. With this arrangement, it is also possible to ascertain whether any control rod assembly 21 is stuck between its fully inserted end and fully withdrawn position and also which position it is in.

Referring again to FIG. 4, it is to be noted that proper design dimensioning of the diametrical clearance between piston 45 and cylinder 56 at restriction 80 is necessary along with proper design dimensioning of a distance given the reference character X, in order to stop the upward piston movement short of impact with the latch 89 but still safely above the latched or engaged position.

It will therefore be apparent that there has been disclosed nuclear reactor having drive mechanisms for control rod assemblies which are: capable of positively and mechanically holding a plurality of control rod assemblies in a fully withdrawn position; are capable of hydraulically decelerating a withdrawn control rod thereby preventing possible damage due to impact; and, are capable of positively controlling either a single control rod assembly or a plurality of control rod assemblies which are designed to be either completely inserted or completely withdrawn from a core of a nuclear reactor.

Since numerous changes may be made in the above described apparatus, and different embodiments of the invention may be made without departing from the spirit and scope thereof, it is intended that all the matter contained in the foregoing description or shown in the accompanying drawings shall be interpreted as illustrative and not in a limiting sense.

It is claimed:

1. A nuclear reactor comprising, a sealed, pressurized, reactor vessel having a plurality of openings in a wall thereof, each opening having a tubular member extending therethrough and sealingly attached thereto, the interior of said tubular member being exposed to the interior of said vessel, a core fixedly positioned within said reactor vessel, said core including a multiplicity of elongated fuel elements in spaced, parallel relationship, and a multiplicity of control rod channels interspersed among said fuel elements, means associated with said sealed reactor vessel and said core contained therein for converting heat produced by said core into useful energy, a plurality of control rod assemblies situated for axial movement within said control rod channels, each of said control rod assemblies including at least one control rod containing neutron absorbing material and a drive shaft attached thereto, a plurality of said drive shafts extending through each of said tubular members attached to said reactor vessel, sealed hollow hydraulic drive means sealingly attached to each of said tubular members for individually moving said drive shafts, and thereby said at least one control rod associated therewith, into and out of said core, said drive means having the interior thereof exposed to the interior of said tubular members, respectively, said drive means including a plurality of cylinders comprising cylindrical channels for respective movement therein of said control rod drive shafts, said plurality of cylinders being located within said drive means, and latching apparatus entirely within said drive means for positively and mechanically holding individual drive shafts of control rods in a withdrawn position, the ends of said drive shafts terminating within said drive means, said latching apparatus including complementary engaging members one mounted on said drive shaft and movable to engage another engaging member mounted entirely within said drive means, said other engaging member including an elongated arm of magnetic material mounted pivotally against a resilient means and biased toward said one engaging member when the control rod associated with said one engaging member is in a withdrawn position, and actuating means for said latching apparatus positioned adjacent said latching apparatus and located on the exterior of said drive means, said actuating means including electromagnetic pole means positioned in alignment with the elongated arm of said other engaging member to move said arm pivotally against said resilient means and away from said one engaging member when said electromagnetic pole means is energized.

2. The nuclear reactor of claim 1, wherein said hydraulic drive means includes decelerating apparatus for smoothly stopping the movement of said control rods during withdrawal from said core, said decelerating apparatus being operated hydraulically.

3. The nuclear reactor of claim 2, wherein said decelerating apparatus comprises a plurality of hydraulic shock absorbers, each of said shock absorbers being associated with an individual control rod drive shaft, each of said hydraulic shock absorbers being formed by an extension of said cylinder within said drive means, said cylinder extension being closed at one end and having its other end opened to the interior of said reactor vessel, said open end having a diameter smaller than the diameter of said cylinder but larger than the diameter of said control rod drive piston, said diameter being sized such that a flow restricting annulus is formed on passage of said piston therethrough, said flow restricting annulus permitting reactor coolant which is trapped within said cylinder extension during withdrawal of individual control rod assemblies to be released therefrom at a preselected rate.

4. The nuclear reactor of claim 2, wherein said decelerating apparatus includes a vent comprising a hole in the wall of said control rod cylinder, said hole flow connecting said cylinder to a pressure source having a lower pressure than the pressure within said reactor vessel, said hole being axially positioned with respect to the lower end of said control rod drive piston such that the hydraulic driving force associated with said drive means and comprising the differential pressure between the pressure within said reactor vessel and the pressure within said low pressure source, is progressively reduced as said control rod reaches a more withdrawn position.

5. The nuclear reactor of claim 1 wherein each of said one engaging members of said latch apparatus comprises a latch rod, each of said rods being located within an extension to each of said control rod cylinders within said drive means, each of said rods having a radial projection at one end for pivotal connection to said drive means and a hook-shaped configuration at the other end of said rods, said other engaging member including a hook-shaped end on each control rod drive piston, and said actuating means allowing individual disengagement of each of said control rod drive shafts from each of said latch rods, respectively.

6. A hydraulically operated control rod drive mechanism for individually moving a plurality of clusters of one or more control rods into and out of a core of a nuclear reactor, each of said clusters including at least one elongated rod containing neutron absorbing material, said drive mechanism having a sealed hollow housing and having mechanical means associated with each of said clusters for individually and positively retaining said clusters in a withdrawn position each of said mechanical means being located entirely within said sealed housing, said mechanical means for retaining each of said clusters in a withdrawn position includes a pair of engaging members, each of said pairs of engaging members for each cluster including a first elongated engaging member of magnetic material connected to said drive mechanism, said first engaging member having a ledge integral therewith, and a second engaging member connected to said cluster, said second engaging member having a ledge integral therewith, said ledges being complementarily positioned so as to become interlocked when said cluster is withdrawn from said core, actuating means for said engaging members located on the exterior of said housing, said actuating members being formed to individually disengage and engaging means, said actuating means including a plurality of electromagnetic pole means positioned respectively adjacent each of said first elongated engaging members to dislodge said ledge when said pole means are energized.

7. The drive mechanism of claim 6, wherein each of said first engaging members comprises a rod with said ledge being integral with one end thereof and being pivotally connected at its other end to said drive mechanism, and wherein each of said second engaging members respectively comprises a rod fixedly connected at one end to its respective cluster, said ledge being integral with the other end, said first and second engaging members thereby having oppositely positioned hook-shaped configurations which interlockingly engage when said cluster is withdrawn from said core.

8. The drive mechanism of claim 6, including means for mechanically maintaining said engaging members in an interlock position said means for mechanically maintaining said engaging members in an interlocked position comprises a resilient member disposed entirely within said drive mechanism and positioned so as to resiliently bias said first engaging member toward an interlocked position.

9. The drive mechanism of claim 6 including decelerating means for smoothly reducing the velocity of said cluster of one or more control rods during withdrawal from said core.

10. The drive mechanism of claim 9 wherein said decelerating means is hydraulically operated and comprises a piston connected to said control rod cluster, a cylinder formed by an elongated channel within said drive mechanism, said piston being mounted for axial movement within said cylinder, said cylinder having a flow restriction formed therein, said flow restriction comprising a localized reduced diameter of said cylinder, said reduced diameter being sized such that a flow restricting annulus is formed on passage of said piston therethrough, said flow restricting annulus allowing hydraulic fluid which is trapped within said elongated channel within said drive mechanism during withdrawal of said control rod to be released therefrom at a preselected rate.

11. The decelerating means of claim 10 including a vent comprising a hole in the wall of said cylinder, said hole flow connecting said cylinder to a pressure source having a pressure lower than the pressure being used to hydraulically withdraw said control rod from said core, said hole being axially positioned within said cylinder such that increased movement of said piston therepast, progressively reduces the hydraulic driving force associated with said drive mechanism, thereby progressively reducing the withdrawal velocity of said control rod.

* * * * *